United States Patent
Shkedi

(10) Patent No.: US 10,834,438 B2
(45) Date of Patent: *Nov. 10, 2020

(54) USER CONTROL OF REPLACEMENT TELEVISION ADVERTISEMENTS INSERTED BY A SMART TELEVISION

(71) Applicant: ALMONDNET, INC., Long Island City, NY (US)

(72) Inventor: Roy Shkedi, Forest Hills, NY (US)

(73) Assignee: AlmondNet, Inc., Long Island City, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/016,448

(22) Filed: Jun. 22, 2018

(65) Prior Publication Data

US 2019/0069005 A1 Feb. 28, 2019

Related U.S. Application Data

(63) Continuation of application No. 15/429,601, filed on Feb. 10, 2017, now Pat. No. 10,009,636, which is a
(Continued)

(51) Int. Cl.
*H04N 21/234* (2011.01)
*H04N 21/81* (2011.01)
(Continued)

(52) U.S. Cl.
CPC ... *H04N 21/23424* (2013.01); *H04N 21/2668* (2013.01); *H04N 21/4147* (2013.01);
(Continued)

(58) Field of Classification Search
CPC .......... H04N 21/23424; H04N 21/812; H04N 21/4147; H04N 21/64322; H04N 21/432;
(Continued)

(56) References Cited

U.S. PATENT DOCUMENTS

| 6,160,989 A | 12/2000 | Hendricks et al. |
| 6,216,129 B1 | 4/2001 | Eldering |

(Continued)

FOREIGN PATENT DOCUMENTS

| JP | 2008-048230 | 8/2008 |
| KR | 10-2006-0025219 | 3/2006 |

(Continued)

OTHER PUBLICATIONS

Roettgers, Janko; Your next TV set may show you advertising spots you actually like; GigaOM; http://gigaom.com; Dec. 14, 2012.
(Continued)

*Primary Examiner* — Oschta I Montoya
(74) *Attorney, Agent, or Firm* — Louis J. Hoffman; David S. Alavi

(57) ABSTRACT

A method is performed using a smart TV, which receives from a television signal source device a television signal feed encoding primary television content and then presents that content. The smart TV receives data via the computer network, including first data representing a to-be-replaced portion of the primary television content and second data representing secondary television content. Using the second data, the smart TV automatically presents the secondary television content in place of the to-be-replaced television content. The method includes the smart TV: (a) automatically monitoring, during presentation of the secondary television content, the television signal feed and comparing it with the first data; and (b) automatically altering presentation of the secondary television content in accordance with a user-control action with respect to the television signal source device, in response to detecting any difference between the television signal feed and the first data indicative of that user-control action.

20 Claims, 2 Drawing Sheets

Related U.S. Application Data continuation of application No. 14/763,963, filed as application No. PCT/US2014/013924 on Jan. 30, 2014, now Pat. No. 9,571,865, which is a continuation of application No. 13/754,639, filed on Jan. 30, 2013, now Pat. No. 8,713,600.

(51) Int. Cl.
   *H04N 21/4147*   (2011.01)
   *H04N 21/643*    (2011.01)
   *H04N 21/432*    (2011.01)
   *H04N 21/458*    (2011.01)
   *H04N 21/2668*   (2011.01)
   *H04N 21/44*     (2011.01)
   *H04N 21/442*    (2011.01)

(52) U.S. Cl.
   CPC ..... *H04N 21/432* (2013.01); *H04N 21/44008* (2013.01); *H04N 21/44222* (2013.01); *H04N 21/458* (2013.01); *H04N 21/64322* (2013.01); *H04N 21/812* (2013.01)

(58) Field of Classification Search
   CPC ............ H04N 21/458; H04N 21/2668; H04N 21/44008; H04N 21/44222
   See application file for complete search history.

(56) References Cited

U.S. PATENT DOCUMENTS

| | | |
|---|---|---|
| 6,366,298 B1 | 4/2002 | Haitsuka et al. |
| 6,446,261 B1 | 9/2002 | Rosser |
| 6,698,020 B1 | 2/2004 | Zigmond et al. |
| 6,832,207 B1 | 12/2004 | Shkedi |
| 6,845,396 B1 | 1/2005 | Kanojia |
| 6,925,440 B1 | 8/2005 | Shkedi |
| 6,973,436 B1 | 12/2005 | Shkedi |
| 7,020,888 B2 | 3/2006 | Reynolds et al. |
| 7,043,746 B2 | 5/2006 | Ma |
| 7,072,853 B2 | 7/2006 | Shkedi |
| 7,092,926 B2 | 8/2006 | Cerrato |
| 7,103,904 B1 | 9/2006 | Blackketter et al. |
| 7,152,237 B2 | 12/2006 | Flickinger et al. |
| 7,260,823 B2 | 8/2007 | Schlack et al. |
| 7,428,493 B2 | 9/2008 | Shkedi |
| 7,454,364 B2 | 11/2008 | Shkedi |
| 7,747,745 B2 | 6/2010 | Shkedi |
| 7,818,763 B2 | 10/2010 | Sie et al. |
| 7,822,637 B2 | 10/2010 | Shkedi |
| 7,822,639 B2 | 10/2010 | Shkedi |
| 7,861,260 B2 | 12/2010 | Shkedi |
| 7,890,609 B2 | 2/2011 | Shkedi |
| 7,899,915 B2 | 3/2011 | Reisman |
| 7,941,528 B2 | 5/2011 | Hicks et al. |
| 7,979,307 B2 | 7/2011 | Shkedi |
| 7,984,466 B2 | 7/2011 | Eldering et al. |
| 7,987,491 B2 | 7/2011 | Reisman |
| 8,051,444 B2 | 11/2011 | Shkedi |
| 8,065,696 B2 | 11/2011 | Scott, III et al. |
| 8,079,052 B2 | 12/2011 | Chen et al. |
| 8,108,895 B2 | 1/2012 | Anderson et al. |
| 8,166,501 B2 | 4/2012 | Shikuma |
| 8,200,822 B1 | 6/2012 | Shkedi |
| 8,204,783 B2 | 6/2012 | Shkedi |
| 8,204,965 B2 | 6/2012 | Shkedi |
| 8,239,264 B2 | 8/2012 | Shkedi |
| 8,244,574 B2 | 8/2012 | Shkedi |
| 8,244,582 B2 | 8/2012 | Shkedi |
| 8,244,583 B2 | 8/2012 | Shkedi |
| 8,244,586 B2 | 8/2012 | Shkedi |
| 8,280,758 B2 | 10/2012 | Shkedi |
| 8,281,336 B2 | 10/2012 | Shkedi |
| 8,307,390 B2 | 11/2012 | Holden |
| 8,341,247 B2 | 12/2012 | Shkedi |
| 8,375,409 B2 | 2/2013 | Chang et al. |
| 8,494,904 B2 | 7/2013 | Shkedi |
| 8,566,164 B2 | 10/2013 | Shkedi |
| 8,589,210 B2 | 11/2013 | Shkedi |
| 8,595,069 B2 | 11/2013 | Shkedi |
| 8,600,815 B2 | 12/2013 | Shkedi |
| 8,607,267 B2 | 12/2013 | Shkedi |
| 8,671,139 B2 | 3/2014 | Shkedi |
| 8,677,398 B2 | 3/2014 | Shkedi |
| 8,683,502 B2 | 3/2014 | Shkedi |
| 8,695,032 B2 | 4/2014 | Shkedi |
| 8,775,249 B2 | 7/2014 | Shkedi |
| 8,959,146 B2 | 2/2015 | Shkedi |
| 8,997,138 B2 | 3/2015 | Shkedi |
| 9,071,886 B2 | 6/2015 | Shkedi |
| 9,078,035 B2 | 7/2015 | Shkedi |
| 9,083,853 B2 | 7/2015 | Shkedi |
| 9,131,282 B2 | 9/2015 | Shkedi |
| 9,208,514 B2 | 12/2015 | Shkedi |
| 9,226,019 B2 | 12/2015 | Shkedi |
| 9,271,024 B2 | 2/2016 | Shkedi |
| 9,351,053 B2 | 5/2016 | Shkedi |
| 9,369,779 B2 | 6/2016 | Shkedi |
| 9,508,089 B2 | 11/2016 | Shkedi |
| 9,591,380 B2 | 3/2017 | Shkedi et al. |
| 9,756,372 B2 | 9/2017 | Shkedi |
| 9,800,917 B2 | 10/2017 | Shkedi |
| 9,813,778 B2 | 11/2017 | Shkedi |
| 9,830,615 B2 | 11/2017 | Shkedi |
| 2002/0013943 A1 | 1/2002 | Haberman et al. |
| 2002/0019769 A1 | 2/2002 | Barrits et al. |
| 2002/0059602 A1 | 5/2002 | Macrae et al. |
| 2002/0078444 A1 | 6/2002 | Krewin et al. |
| 2002/0082910 A1 | 6/2002 | Kontogouris |
| 2002/0120929 A1 | 8/2002 | Schwalb et al. |
| 2002/0120933 A1 | 8/2002 | Knudson et al. |
| 2002/0123928 A1 | 9/2002 | Eldering et al. |
| 2002/0124249 A1 | 9/2002 | Shintani |
| 2002/0124253 A1 | 9/2002 | Eyer et al. |
| 2002/0129368 A1 | 9/2002 | Schlack et al. |
| 2002/0144262 A1* | 10/2002 | Plotnick ............... G11B 27/005 725/32 |
| 2002/0178443 A1 | 11/2002 | Ishii |
| 2002/0191950 A1 | 12/2002 | Wang |
| 2003/0051242 A1 | 3/2003 | Donnelly |
| 2003/0066078 A1 | 4/2003 | Bjorgan et al. |
| 2003/0093792 A1 | 5/2003 | Labeeb |
| 2003/0126597 A1 | 7/2003 | Darby et al. |
| 2003/0135853 A1 | 7/2003 | Goldman et al. |
| 2003/0145323 A1 | 7/2003 | Hendricks et al. |
| 2003/0149975 A1 | 8/2003 | Eldering et al. |
| 2003/0154128 A1 | 8/2003 | Liga et al. |
| 2003/0188317 A1 | 10/2003 | Liew et al. |
| 2003/0208756 A1 | 11/2003 | Macrae et al. |
| 2003/0208758 A1 | 11/2003 | Schein et al. |
| 2003/0226141 A1 | 12/2003 | Krasnow et al. |
| 2003/0235390 A1* | 12/2003 | Nygren ................. H04N 21/21 386/246 |
| 2004/0003406 A1 | 1/2004 | Billmaier |
| 2004/0005143 A1 | 1/2004 | Tsuru et al. |
| 2004/0034874 A1 | 2/2004 | Hord et al. |
| 2004/0103429 A1* | 5/2004 | Carlucci ................. H04N 7/163 725/32 |
| 2004/0107437 A1 | 6/2004 | Reichardt et al. |
| 2004/0117827 A1 | 6/2004 | Karaoguz et al. |
| 2004/0158858 A1 | 8/2004 | Paxton et al. |
| 2004/0163101 A1 | 8/2004 | Swix et al. |
| 2004/0172650 A1 | 9/2004 | Hawkins et al. |
| 2004/0228605 A1 | 11/2004 | Quan et al. |
| 2005/0034171 A1 | 2/2005 | Benya |
| 2005/0076359 A1 | 4/2005 | Pierson et al. |
| 2005/0086112 A1 | 4/2005 | Shkedi |
| 2005/0108776 A1 | 5/2005 | Carver et al. |
| 2005/0207731 A1 | 9/2005 | Unger |
| 2006/0013556 A1 | 1/2006 | Poslinksi |
| 2006/0070095 A1 | 3/2006 | Newton et al. |
| 2006/0218602 A1 | 9/2006 | Sherer et al. |
| 2006/0222322 A1 | 10/2006 | Levitan |
| 2006/0235756 A1 | 10/2006 | Pellgrino |

(56) References Cited

U.S. PATENT DOCUMENTS

| | | |
|---|---|---|
| 2006/0277569 A1 | 12/2006 | Smith |
| 2007/0204310 A1 | 8/2007 | Hua et al. |
| 2008/0127246 A1 | 5/2008 | Sylvain |
| 2008/0256572 A1 | 10/2008 | Chen |
| 2009/0037949 A1 | 2/2009 | Birch |
| 2009/0049468 A1 | 2/2009 | Shkedi |
| 2009/0100460 A1 | 4/2009 | Hicks, III et al. |
| 2009/0106792 A1 | 4/2009 | Kan et al. |
| 2009/0172723 A1 | 7/2009 | Shkedi et al. |
| 2009/0217324 A1 | 8/2009 | Massimi |
| 2009/0290852 A1 | 11/2009 | Wright |
| 2010/0030639 A1* | 2/2010 | Feng ............ G06Q 30/02 705/14.43 |
| 2010/0043022 A1 | 2/2010 | Kaftan |
| 2010/0058380 A1 | 3/2010 | Yu et al. |
| 2010/0058382 A1 | 3/2010 | Yu et al. |
| 2010/0269128 A1 | 10/2010 | Gordon |
| 2011/0321083 A1 | 12/2011 | Rouse et al. |
| 2012/0023522 A1 | 1/2012 | Anderson et al. |
| 2012/0143660 A1 | 6/2012 | Jiwang et al. |
| 2012/0159549 A1 | 6/2012 | Douillet et al. |
| 2012/0314140 A1 | 12/2012 | Wiser et al. |
| 2013/0024888 A1 | 1/2013 | Sivertsen |

FOREIGN PATENT DOCUMENTS

| | | |
|---|---|---|
| WO | WO2007047310 | 4/2007 |
| WO | WO2009157903 | 12/2009 |

OTHER PUBLICATIONS

Constine, Josh; Gracenote's Ad Replacement System That Personalizes TV Commercials Will Start Trials in 2013; http://techcrunch.com; Dec. 26, 2012.

Freidman, Wayne; Gracenote, Invidi Deal Ups Real-Time Ad for TV; MediaDailyNews; http://www.mediapost.com; Jan. 16, 2013.

Mandese, Joe; Why Invidi's Deal With Gracenote Will Accelerate Real-Time TV Targeting; RTBlog; http://www.mediapost.com; Jan. 17, 2013.

"Venture Market Summary"; VentureWire Alert; Mar. 29, 2005.

"TiVo Launches New Interactive Advertising Technology"; press release from www.tivo.com; Jul. 18, 2005.

"TiVo Announces First Advertising Search Product for Television"; press release from www.tivo.com; Nov. 28, 2005.

"TiVo Begins Rollout of Online Services Now Accessible Directly on the TV"; press release from www.tivo.com; Dec. 1, 2005.

"TiVo Launches Telecision's New Advertising Search Product"; press release from www.tivo.com; May 8, 2006.

"TiVo to Insert Ads at End of Programs"; The Wall Street Journal Online; Nov. 28, 2006.

Haughey, M.; "TiVo to add banner ads to service when fast forwarding"; www.PVRblog.com; Nov. 16, 2004.

Piccalo, G.; "TiVo Will No Longer Skip Past Advertisers; The tool that lets viewers control the TV will soon spoint 'billboards' and track viewing habits"; Los Angeles Times; Nov. 17, 2004.

Rojas, P.; "TiVo planning banner ads for when you fast-forward"; www.engadget.com; Nov. 17, 2004.

Haughey, M.; "Icon ads over commercials at TiVo"; www.PRVblog.com; Mar. 29, 2005.

"Targeted Visitor Ad"; web page at http://adservices.zango.com/Advertise/SearchSolutions.aspx; 2007.

"Zango to Pay $3 Million, Settles FTC Charges"; archived web page at www.marketingvox.com; Nov. 3, 2006.

Nelson, M.G.; "Microsoft Launches Clickable Video Ads for Kohl's"; web page at http://clickz.com/3625272; Mar. 19, 2007.

Joe, R.; "EveryZing Makes Everything Searchable"; web page at http://www.speechtechmag.com/Articles/ReadArticle.aspx?ArticleID=39598; Sep. 11, 2007.

Luening, E.; "Free ISP NetZero beefs up ad services"; web page at http://www.news.com/Free-ISP-NewZero-beefs-up-ad-services/2100-1023_3-241067.html; Jan. 2, 2002.

Blinkx TV White Paper 1.0; Blinkx Inc.; Jan. 2005.

Mandese, J.; "AOL Unveils Video 'Ticker' Ads, New Alternative to Pre-Roll"; from www.mediapost.com; Nov. 19, 2007.

International Search Report and Written Opinion of the International Searching Authority (KR); PCT/US2014/013924; dated May 9, 2014.

\* cited by examiner

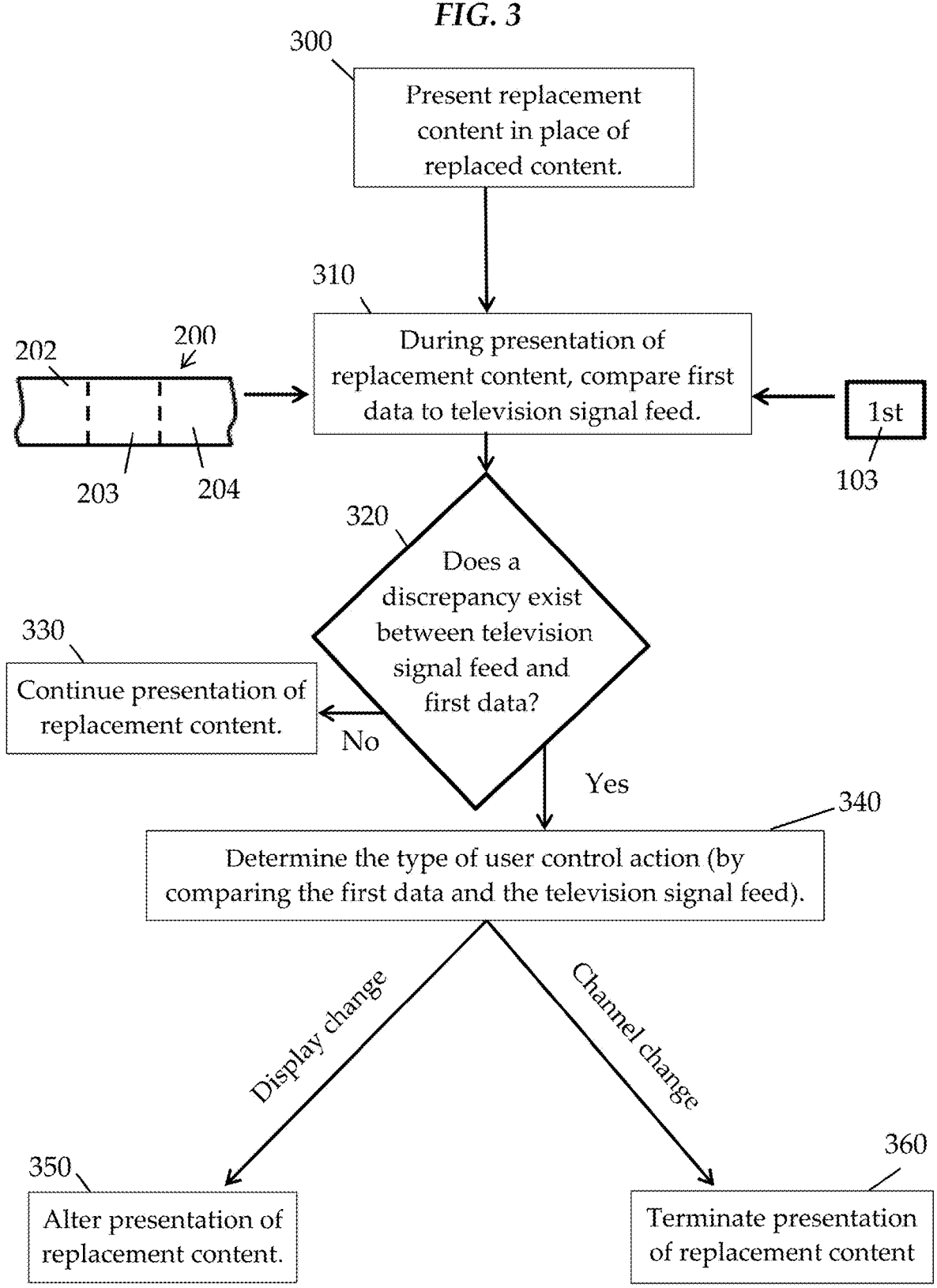

USER CONTROL OF REPLACEMENT TELEVISION ADVERTISEMENTS INSERTED BY A SMART TELEVISION

CROSS-REFERENCE TO RELATED APPLICATIONS

This application is a continuation of application Ser. No. 15/429,601, filed Feb. 10, 2017, now U.S. Pat. No. 10,009,636, which is a continuation of application Ser. No. 14/763,963, filed Jul. 28, 2015, now U.S. Pat. No. 9,571,865, which is a U.S. National Stage Entry filed under 35 U.S.C. § 371 of application PCT/US2014/013924, filed Jan. 30, 2014, which claims the benefit of U.S. application Ser. No. 13/754,639, filed Jan. 30, 2013, now U.S. Pat. No. 8,713,600.

BACKGROUND

The field of the present invention relates to targeted television ad replacement using a so-called "smart TV." In particular, systems and methods are disclosed herein for terminating or altering targeted television ad replacement in response to a user-control action.

A goal of modern television advertising is targeted selection of advertisements for individual households or even for specific viewers in those households. Numerous techniques and methodologies are available for (i) collecting user profile information from one or more sources (online or offline), (ii) using that profile information to select one or more targeted advertisements, (iii) using the profile information to select one or more programs or channels for presenting the targeted advertisements, and (iv) correlating subsequent viewer actions after presenting the targeted advertisements. Some of these techniques and methodologies are described in:

U.S. Pat. No. 7,861,260 entitled "Targeted television advertisements based on online behavior" issued Dec. 28, 2010 to Shkedi;

U.S. Pat. No. 8,566,164 entitled "Targeted online advertisements based on viewing or interacting with television advertisements" issued Oct. 22, 2013 in the names of Shkedi et al.;

U.S. Pat. No. 9,083,853 entitled "Targeted television advertisements associated with online users' preferred television programs or channels" issued Jul. 14, 2015 in the name of Shkedi;

U.S. Pat. No. 8,051,444 entitled "Targeted television advertisements selected on the basis of an online user profile and presented with television programs or channels related to that profile" issued Nov. 1, 2011 to Shkedi; and U.S. Pat. No. 7,890,609 entitled "Requesting offline profile data for online use in a privacy-sensitive manner" issued Feb. 15, 2011 to Shkedi.

Typically a targeted television advertisement is inserted into the stream of presented television content in place of a non-targeted advertisement. A "targeted advertisement" refers to an advertisement shown to users based on taking into account user-specific profile information. A "non-targeted advertisement" refers to an advertisement shown to a large group of users without use of user-specific profile information; it may be "targeted" in a different sense, such as selected based on broad demographic characteristics, such as the demographic characteristics of users who watch a particular television program. A variety of technological approaches are employed to achieve proper insertion of targeted television advertisements into the stream of presented television content.

In some cases, capabilities of a so-called "smart television" (i.e., smart TV 100 shown in FIG. 1) are utilized to achieve insertion of the targeted, replacement television advertisement in place of a non-targeted television advertisement. A smart television, like any other television, has a connection to one or more television signal source devices. Examples of television signal source devices 130 can include, but are not limited to: a digital antenna; a set-top box (STB) for cable, satellite, or Internet Protocol Television (IPTV); a digital video recorder (DVR); a so-called entertainment-oriented device (EOD) such as a game console or a so-called "Over The Top" device (OTT; examples include Apple TV® or Roku®). Smart TV 100 receives from television signal source device 130 a television signal feed 200 that has encoded thereon television content and presents via television display 101 the encoded television content. Television content, as used herein in any context, may comprise audio or video or both. Television content encoded in television signal feed 200 shall be referred to herein as the primary television content. The television content can be encoded into television signal feed 200 by television signal source device 130, or it can merely pass through that device already encoded. The primary television content can include programming of any sort (e.g., live, recorded, on-demand, broadcast, multicast, unicast, and so on). The primary television content often includes one or more non-targeted or targeted television advertisements (broadcast, multicast, or unicast), which can be inserted by television signal source device 130 or are already present in the primary television content by the time the television signal feed reaches that device. An example can include a STB uncompressing a broadcasted MPEG2 compressed 720p television program into a 720p uncompressed format, which is delivered from STB 130 to smart TV 100 via HDMI interface 135. The television program can include advertisements broadcasted as part of the program or advertisements inserted into the program by STB 130 (instead of or in addition to the broadcasted ads).

As also seen in FIG. 1, smart TV 100 also has its own connection 145 to computer network 140 through which smart TV 100 can be provided with online access, e.g., access to the Internet. Smart TV 100 can receive television content through computer network connection 145. Smart TV 100 also includes one or more computer processors or processor cores 110 and one or more computer memories 120 (collectively referred to hereinafter as the "smart TV computer" or simply "computer" 160) that enable it to receive, store, or process data or programming instructions. Such data and programming can be employed, e.g., to enable smart TV 100 to receive targeted television advertisements and to present them in place of non-targeted television advertisements that are part of the primary television content.

An example of a conventional method for inserting a targeted television advertisement into stream 200, shown in FIG. 2, of primary television content can be performed as follows using computer network connection 145 and smart TV computer 160. Smart TV 100 receives via computer network 140 electronic indicia of data representative of portions of the primary television content. First data 103 represents the portion of the primary television content intended to be replaced (e.g., typically a non-targeted advertisement; referred to as the "to-be-replaced content" or simply "replaced content" 203); other data 102 represents a portion of the primary television content that immediately precedes replaced content 203 (referred to as the "preceding content" 202; e.g., another advertisement or a portion of programming content). Smart TV 100 receives via computer network 140 electronic indicia of second data 105 representative of secondary television content (e.g., typically a targeted advertisement; referred to as "replacement content" 205). Using computer 160, smart TV 100 automatically (i) monitors the television signal feed 200 it receives from television signal source 130 to detect or otherwise determine the end of preceding content 202 and (ii) presents after preceding content 202, using second data 105, replacement content 205 instead of replaced content 203. Once replacement content 205 is presented, smart TV 100 can revert to presentation of the primary television content. In another example, smart TV 100 determines the end of preceding content 202 by identifying a signal or cue sent as part of feed 200. The signal or cue could be embedded in preceding content 202 (such as in the last frame of preceding content 202 for example) or in the gap between preceding content 202 and replaced content 203 or in the beginning of replaced content 203.

In all cases discussed herein, data streams like first data 103 can comprise a so-called "fingerprint" of one or more portions of the primary television content (e.g., a digital video fingerprint generated in any suitable way), a compressed digital encoding of one or more portions of the primary television content, a raw, uncompressed encoding of one or more portions of the primary television content, or other suitable representative data that enables smart TV 100 to identify the corresponding television content in television signal feed 200 (i.e., replaced 203 or preceding 202 content). If a fingerprint of the primary television content is employed, it can be generated according to any one of several known techniques or protocols. One example of a fingerprint of a segment of television content can rely on sampling within every video frame of that segment of the television content. Smart TV 100, or a central server in possession of the segment samples, can compare the samples of the segment with a sample taken by smart TV 100 from television signal feed 200. Based on that comparison, smart TV 100 or the central server can recognize a specific frame within the segment. Likewise, the second data can comprise any suitable compressed or uncompressed encoding of the secondary television content (i.e., replacement content 205). Different or parallel compression protocols can be used for first 103 and second 105 data. If a fingerprint of the primary television content is employed for first data 103, it can be generated according to any one of several known techniques or protocols (one example can include taking a sample of audio, video, or both from TV feed 200 and comparing it with an equivalent sample of known content). A given fingerprint of television content can be generated based on both video and audio portions of that content, on the video portion only, or on the audio portion only.

In some other examples (in which fingerprints are not employed or employed partially), smart TV 100 receives via Internet 140 first 103 or second 105 data in, e.g., MPEG4 or other compressed format. The compressed format saves bandwidth so as to enable the parallel transmission of a multitude of different targeted ads to a multitude of corresponding households watching television simultaneously. In one example, entire advertisements (not just portions; the preceding, replaced, and targeted advertisements) are sent to smart TV 100, which then uncompresses the three advertisements. The uncompressed preceding ad 202 is compared with uncompressed television signal feed 200 transmitted from STB 130, e.g., via HDMI. At the end of preceding ad 202, uncompressed, targeted, replacement advertisement 205 is inserted by smart TV 100 in place of replaced advertisement 203. While presenting targeted, replacement advertisement 205, smart TV 100 monitors television signal feed 200 for changes in replaced advertisement 203 by comparing feed 200 with replaced advertisement 203 received over the Internet 140. Alternatively, instead of comparing uncompressed television signal feed 200 and received advertisements, smart TV 100 instead can compress television signal feed 200 and do the comparisons described above using compressed television signal feed 200 and received advertisements.

The example methods and systems described above create a technical problem relating to viewer control. Typically, television signal source device 130 mediates viewer control of the presentation of the primary television content. Various user-control actions can be executed through television signal source device 130, whether by direct manipulation (e.g., pushing buttons on a STB), or by use of a remote control or auxiliary device 150 (e.g., a tablet or smartphone software application controlling the STB). Examples of user-control actions executed through television signal source device 130 can include a channel change or a display change.

A channel change denotes switching among multiple different streams of distinct broadcast, multicast, unicast, or locally stored television content that can be live, prerecorded, time-shifted, or on-demand. A display change can include: (i) a so-called "trick mode" (e.g.: fast forward at various speeds such as 4×, 8×, 32×, or other; rewind or fast reverse at various speeds such as 4×, 8×, 32×, or other; pause or resume; or skipping forward or backward by various specified time intervals, numbers of frames, or scenes); (ii) loop, repeat, or replay; (iii) slow motion or stop action; (iv) changing the zoom, stretch, or aspect ratio; (v) changing viewing angle or other 3D viewing parameter(s); (vi) changing between, e.g., "standard," "movie," "sports," "game," or other display presets; or (vii) changing backlight, contrast, brightness, color, tint sharpness, color temperature, or other picture quality parameters.

Such user-control actions, when executed through television signal source device 130, affect television signal feed 200, which in turn affects the presentation by smart TV 100 of the primary television content. In that capacity, smart TV 100 acts as a passive presentation device, becoming "active" (i.e., directly affecting the presentation of television content) only when it presents a replacement advertisement or other replacement television content 205. Note that some display changes can also be executed using smart TV 100 (e.g., items (iv)-(vii) listed above, or even items (i)-(iii) if smart TV 100 has sufficient memory 120 or buffering capabilities), even when presenting television content provided by television signal source device 130 via television signal feed 200. However, only those display changes executed through television signal source device 130 are considered for purposes of the present disclosure.

Because user-control actions, when executed through television signal source device 130, affect only television signal feed 200 from television signal source device 130, such user-control actions ordinarily would have no discernible effect on any replacement television content 205 being presented on smart TV display 101. In other words, in conventional techniques, if a viewer attempts to execute a control action during presentation of replacement content 205, the control action would appear disabled. The control action indeed would affect television signal feed 200 (fast forward, pause, etc.), but display 101 would continue to show replacement content 205, undisturbed by the control action. This state of affairs (i.e., seemingly ineffectual user-control actions) would persist until replacement content 205 finished showing, at which time presentation would revert to the primary television content (presumably modified, unbeknownst to the user, in compliance with the intervening user-control actions, or perhaps just the last user-control action).

It would be desirable to provide systems and methods that mitigate the problem described above.

SUMMARY

A method is performed using computer 160 associated with television display 101 and connected to computer network 140 and to television signal source device 130 (collectively, a so-called smart TV 100). Smart TV 100 receives from television signal source device 130 television signal feed 200 having encoded thereon primary television content, and presents the primary television content via television display 101. Computer 160 is programmed to utilize data received via computer network 140, including (i) first data 103 comprising electronic indicia of a to-be-replaced portion 203 of the primary television content and (ii) second data 105 comprising electronic indicia of secondary television content 205. Computer 160 is programmed to present automatically via television display 101, using second data 105, at least a portion of secondary television content 205 in place of the to-be-replaced television content 203, see FIGS. 2 and 300 of FIG. 3.

The method comprises: (a) during presentation of secondary television content 205, automatically monitoring, with computer 160, television signal feed 200 and comparing it with the first data 103; and (b) in response to detecting any difference, between television signal feed 200 and first data 103, indicative of a user-control action with respect to television signal source device 130, automatically altering, with computer 160, the presentation of secondary television content 205 in accordance with the user-control action.

Objects and advantages pertaining to presenting replacement television content using a smart TV may become apparent upon referring to the embodiments disclosed in the following written description or outlined in the appended claims.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF DRAWINGS

FIG. 3 is a flow chart illustrating an exemplary method.

DETAILED DESCRIPTION OF EMBODIMENTS

Figure 1:
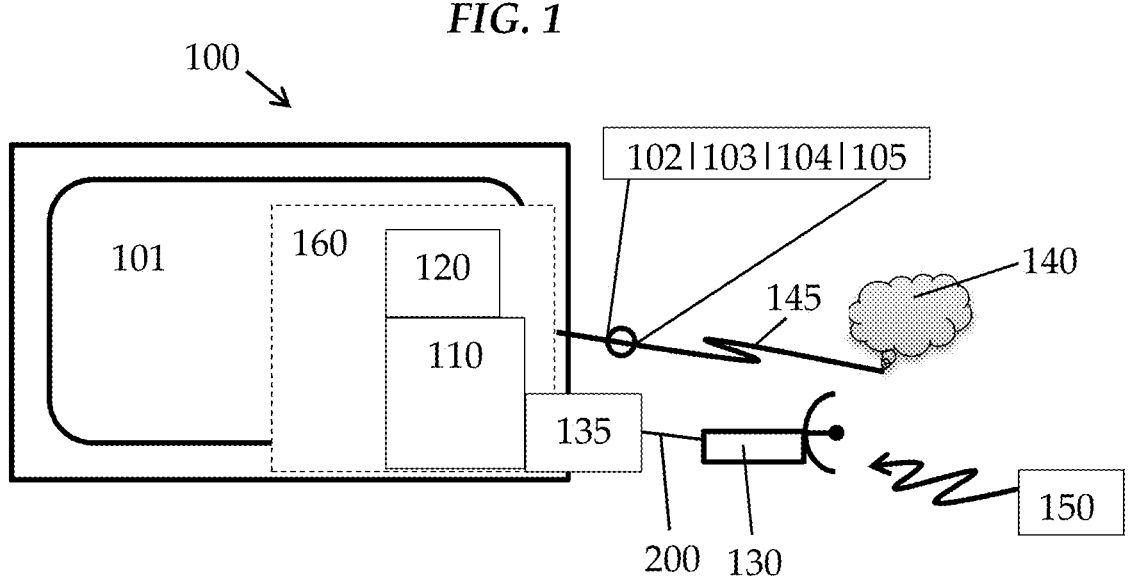
FIG. 1 is a block diagram of an embodiment of the smart TV showing its connection to an exemplary television signal source device and computer network.
Figure 2:
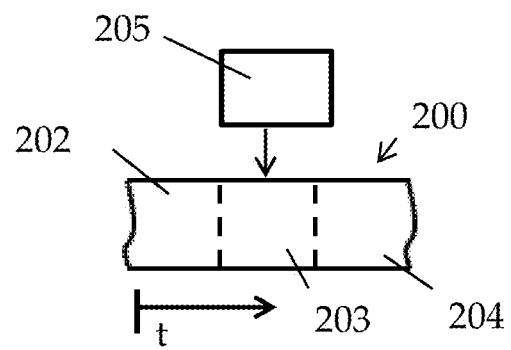
FIG. 2 is a schematic diagram illustrating content replacement in an exemplary television signal feed.

In one or more of the illustrative embodiments disclosed herein, various examples of methods for inserting a targeted television advertisement into a stream of primary television content can be performed as follows using various examples of systems that include computer network connection 145 and computer 160 of smart TV 100. Parts of those methods proceed substantially as described above.

In a first group of one or more embodiments, using computer 160 and first data 103, smart TV 100 automatically compares, as in 310 of FIG. 3, during presentation of replacement content 205 via smart TV 100, television signal feed 200 with first data 103 (representative of replaced content 203). Any detected discrepancy between television signal feed 200 and first data 103 indicates that a user has performed a user-control action with respect to television signal source device 130. For example, if the user attempts a display change (e.g., a trick mode) or a channel change, first data 103 (indicative of replaced content 203 at regular viewing speed), would no longer correspond to television signal feed 200, because the user-control action would alter the signal feed. If no such discrepancy is detected (indicating no user-control action was attempted) and presentation of replacement content 205 finishes without any user-control action being taken, as in 330 of FIG. 3, then in some embodiments, presentation of television content via smart TV 100 can, as in the conventional examples, simply revert to presentation of the primary television content. Depending on whether replaced content 203 is finished when replacement content 205 finishes, presentation may revert to an end portion of replaced content 203 or to a portion of the primary content immediately after replaced content 203 (referred to as "succeeding content" 204).

If replacement television content 205 ends before replaced television content 203, an end portion of replaced television content 203 might be presented after completion of replacement content 205. That may result in a television presentation that may be jarring, confusing, or annoying to viewers due to the abrupt and seemingly mysterious appearance of a fragment of replaced content 203. In a second group of one or more embodiments, if replacement content 205 reaches its end before the end of replaced content 203, smart TV 100 can present a black screen (or a blank screen of a different color, a user-selected color controlled by a user setting in the smart TV, or any other suitable filler material) to fill the gap between the end of replacement content 205 and the end of replaced content 203. A black screen can be used in countries where a black screen identifies the end of one segment of television content and the beginning of a succeeding segment of unrelated television content (e.g., a transition from a television program to a television advertisement, from one television advertisement to another, or from a television advertisement to a television program). In countries where a different type of screen is used to identify the end of one segment of content and the beginning of the next, that corresponding kind of screen will be inserted as filler content by smart TV 100 to fill the gap from the end of replacement content 205 to the end of replaced content 203. In one example implementation of a black screen, smart TV 100 inserts the black frames. When smart TV 100, using computer 160 and first data 103, detects the end of replaced content 203 in television signal feed 200 while presenting such filler content, it can then revert presentation to the primary television content encoded in television signal feed 200, providing the viewer with a smooth transition from replacement content 205 to succeeding content 204.

If, on the other hand, smart TV 100 does detect a discrepancy, in 320 of FIG. 3, between first data 103 (indicative of replaced content 203) and television signal feed 200, that indicates that a user-control action was attempted. In a third group of one or more embodiments, in response to detecting such a discrepancy, smart TV 100 automatically terminates presentation of replacement content 205 and reverts to presentation of replaced content 203. That shift eliminates the misleading appearance that the user-control action did not work, because smart TV 100 discontinues presentation of replacement content 205, and the viewer can see the effects of his or her control action on the resumed presentation of replaced content 203.

However, as with the case where replacement content 205 ends before replaced content 203 ends, this situation also results in presentation of television content that may appear jarring, confusing, or annoying to viewers due to the sudden switch, upon attempting to execute a user-control action, between different television advertisements. An exception is the case wherein the user-control action is a channel change; in that instance the abrupt appearance of different television content would be expected.

A fourth group of one or more embodiments help eliminate the presentation problems described in the previous paragraphs. In response to detecting, at 320 of FIG. 3, a discrepancy between first data 103 (representative of replaced content 203) and television signal feed 200, smart TV 100 can automatically, using computer 160 and first data 103, determine, as shown at 340 of FIG. 3, what type of user-control action has been executed, e.g., fast forward, fast reverse, pause, or channel change. Because the user-control action is done with respect to television signal source device 130, and not smart TV 100, determination of the type of user-control action cannot typically be done directly. Instead, in 340 of FIG. 3, smart TV 100 determines the user-control action by comparing first data 103 and television signal feed 200. For example, if first data 103 includes the video portion of replaced content 203, then smart TV 100 can compare the first data video with the video portion of television signal feed 200. A pause action on signal source device 130 results in the freezing of the video on one particular frame. Smart TV 100 can identify the frozen frame by comparing the first data video frames with the signal feed frozen frame. The comparison can be made between entire frames or between only sample sets of pixels of each frame. A fast forward action on signal source device 130 results in only selected frames being sent in television signal feed 200 to smart TV 100 (the higher the fast forward rate, the fewer and further between are the selected frames sent to the smart TV). Smart TV 100 can compare whole frames or sample pixels in the received signal feed frames with whole frames or sample pixels in the first data to recognize the selected fast-forward rate (e.g., 4×, 8×, or 32× regular viewing speed). A fast reverse action on the signal source device can be identified in a similar way. A channel change can be identified when smart TV 100 cannot find a match between a frame of the video in television signal feed 200 and a frame of the video in first data 103. The comparison of television signal feed 200 and first data 103 typically is based on video for recognizing a display change, including trick mode functionality such as pause, resume, fast forward, rewind, fast reverse, or skip. For recognizing a channel switch or the end of a replaced advertisement, audio or video or both can be used as a basis for comparison. Alternatively, smart TV 100 can determine the type of user-control action in those cases wherein television signal source device 130 reports the type of user-control action to smart TV 100, for example via a CEC (Consumer Electronics Control) connection over HDMI.

If the user-control action is a channel change, then smart TV 100 can simply terminate presentation of replacement television content 205, see 360 of FIG. 3, and revert to presentation of replaced television content 203 encoded on television signal feed 200 (now altered due to the channel change). As noted above, the abrupt appearance of different presented television content would be expected in that instance.

If smart TV 100 determines that the user-control action is a display change such as a trick mode, then, using computer 160 and second data 105, smart TV 100 can alter presentation of replacement content 205, see 350 of FIG. 3, to substantially match the altered television signal feed. For example, if a fast forward of replaced content 203 is detected, then smart TV 100 can adjust presentation of replacement content 205 by fast-forwarding it in parallel (e.g., by skipping frames). Smart TV 100 can be programmed to mimic in its presentation of replacement content 205 the effect of various user-control display change actions on replaced content 203. The substitution of replacement content 205 for replaced content 203 therefore becomes "transparent" to the viewer, who can no longer necessarily discern whether he or she is seeing the original television content (e.g., a non-targeted television advertisement) versus replacement television content (e.g., a targeted television advertisement). User-control actions (channel change or display change) appear to function normally even if replacement content 205 is being presented.

In a fifth group of one or more embodiments, after replacement content 205 has been presented and its display completed, smart TV 100 can again insert replacement content 205 if, for example, a rewind or fast reverse user-control action is executed beginning from a time after the conclusion of replacement content 205. To accomplish this, the sequence of steps described above can be executed again, with smart TV 100 detecting succeeding content 204, presenting replacement content 205 (possibly altered depending on user-control actions), monitoring television signal feed 200 during a second presentation of replacement content 205, and terminating or altering the repeated presentation of replacement content 205 in response to a user-control action. A purpose of this technique is to allow the user to review replacement content 205 after the succeeding television show (for example) resumes. Without this technique, if the user rewinds from a point after replacement content 205 has been completed, the user would see replaced content 203 instead of replacement content 205, and the user would not be able to find replacement content 205. To enable such "rewinding" of replacement content 205, smart TV 100 receives electronic indicia of additional data 104 that represents a portion of the primary television content that immediately follows replaced content 203 (i.e., succeeding content 204) or creates such additional data by itself, for example by fingerprinting succeeding content 204 or simply recording it. Smart TV 100 automatically monitors the rewound television signal feed 200 it receives from television signal source 130 and compares it with additional data 104 to detect or otherwise determine the beginning of succeeding content 204.

In some instances, the same replacement content 205 can be inserted each time replaced content 203 (or preceding content 202 or succeeding content 204) is detected by smart TV 100. In other instances, different replacement content can be inserted in place of replaced content 203; the choice of replacement content is part of the targeting process when the replacement content is a targeted advertisement. Any suitable sequence of replacement content can be employed for insertion in place of a given portion of replaced content 203 upon repeated encounters with that given portion. In one example, the same advertisement can be presented each time the given portion of replaced content 203 is encountered (forward or backward). In another example, one advertisement can be presented a number of times, followed by another advertisement presented a number of times, and so on. In a third example, number of different advertisements can be rotated through one at a time at each encounter with the replaced content. In a fourth example, each replacement advertisement is presented during only one encounter with the given replacement content; at each subsequent encounter a new advertisement is presented that has not been presented before.

In a sixth group of one or more embodiments, if the television content that includes the preceding and succeeding content 202, 204 is replayed at a later time (e.g., stored on a DVR or retrieved from an "on-demand" system), the same replacement content 205 can be presented each time the primary content is replayed, or different replacement content can be selected than would be selected for the initial or earlier presentations of the content. Subsequent replays can include still other replacement content. Any suitable variation, selection, or rotation of replacement content, including those described in the preceding paragraph, can be employed.

The systems and methods disclosed herein can be implemented as general or special purpose computers or servers or other programmable hardware devices programmed through software, or as hardware or equipment "programmed" through hard wiring, or a combination of the two. A "computer" (e.g., as in a "smart TV") can comprise a single processor, processor core, or machine or can comprise multiple interacting processors, processor cores, or machines (located at a single location or at multiple locations remote from one another). A computer memory or computer-readable medium can be encoded with a computer program, so that execution of that program by one or more computers causes the one or more computers to perform one or more of the methods disclosed herein. Suitable media can include temporary or permanent storage or replaceable media, such as network-based or Internet-based or otherwise distributed storage of software modules that operate together, RAM, ROM, CD ROM, CD-R, CD-R/W, DVD ROM, DVD±R, DVD±R/W, hard drives, thumb drives, flash memory, optical media, magnetic media, semiconductor media, or any future storage alternatives. Such encoded media can be preinstalled already encoded in a smart TV during its manufacture, can be encoded after installation into a smart TV during its manufacture, or can be encoded with "client" or "application" software copied or downloaded into the smart TV after its manufacture. For example, client software can be downloaded to the smart TV as part of occasional or periodic software updates received by the smart TV, typically via its network connection.

In addition to the preceding, the following examples fall within the scope of the present disclosure or appended claims:

EXAMPLE 1

A method performed using a computer associated with a television display and connected to a computer network and to a television signal source device, wherein: a television signal feed having encoded thereon primary television content is received from the television signal source device and the primary television content is presented via the television display; the computer is programmed to utilize data received via the computer network, including (i) first data comprising electronic indicia of a to-be-replaced portion of the primary television content and (ii) second data comprising electronic indicia of secondary television content; the computer is programmed to present automatically via the television display, using the second data, at least a portion of the secondary television content in place of the to-be-replaced television content; and the method comprises: (a) during presentation of the secondary television content, automatically monitoring, with the computer, the television signal feed and comparing it with the first data; and (b) in response to detecting any difference, between the television signal feed and the first data, indicative of a user-control action with respect to the television signal source device, automatically altering, with the computer, the presentation of the secondary television content in accordance with the user-control action.

EXAMPLE 2

The method of Example 1 further comprising reverting to presentation of the primary television content after presenting the secondary television content.

EXAMPLE 3

The method of any preceding Example wherein (i) the user-control action indicated by the detected difference between the television signal feed and the first data is a channel change, and (ii) altering the presentation of the secondary television content comprises terminating presentation of the secondary television content and resuming presentation of the primary television content.

EXAMPLE 4

The method of any preceding Example wherein (i) the user-control action indicated by the detected difference between the television signal feed and the first data is a display change, and (ii) altering the presentation of the secondary television content comprises altering presentation of the secondary television content in a manner analogous to the user-control action indicated by the detected difference between the television signal feed and the first data.

EXAMPLE 5

The method of any preceding Example wherein (i) the primary television content comprises one or more television programs and one or more associated television advertisements, and (ii) the secondary television content comprises one or more replacement television advertisements.

EXAMPLE 6

The method of any preceding Example further comprising, after presenting the secondary television content, automatically presenting filler television content via the television display in place of an end portion of the to-be-replaced television content.

EXAMPLE 7

The method of an preceding Example further comprising, after presenting the secondary television content and after a user-control action of rewinding or fast-reversing the primary television content to a point within or before the to-be-replaced television content, again automatically presenting at least a portion of the secondary television content in place of the to-be-replaced television content.

EXAMPLE 8

The method of any preceding Example further comprising: (c) after presenting the secondary television content and during later time-shifted or on-demand presentation of the primary television content via the television display, automatically presenting different secondary television content in place of the to-be-replaced television content; (d) during presentation of the different secondary television content, automatically monitoring, with the computer, the television signal feed and comparing it with the first data; and (e) in response to detecting any difference, between the television signal feed and the first data, indicative of a user-control action with respect to the television signal source device, automatically altering, with the computer, the presentation of the different secondary television content in accordance with the user-control action.

EXAMPLE 9

A smart TV comprising: a connection to a television signal source device arranged so as to receive from the television signal source a television signal feed having encoded thereon primary television content; a television display structured and connected to present the primary television content; a computer; and a connection to a computer network, wherein the computer is programed to perform the method of any preceding Example.

EXAMPLE 10

An article comprising a computer-readable medium in a smart TV or in a storage device controlled by a server connected to a computer network, which medium encodes computer-readable instructions that, when applied to a computer in a smart TV, instruct the computer to perform the method of any preceding Example.

It is intended that equivalents of the disclosed illustrative embodiments and methods shall fall within the scope of the present disclosure or appended claims. It is intended that the disclosed illustrative embodiments and methods, and equivalents thereof, may be modified while remaining within the scope of the present disclosure or appended claims.

In the foregoing Detailed Description, various features may be grouped together in several illustrative embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., sets of features that are not incompatible or mutually exclusive) that appear in the present disclosure or the appended claims, including those sets that may not be explicitly disclosed herein. In particular, any embodiment that falls within any one of the six groups of embodiments disclosed above, and any embodiment that falls within any combination of two or more of those six groups of embodiments, shall be regarded as falling within the scope of the present disclosure or appended claims. Further, any embodiment explicitly or implicitly disclosed herein can be implemented using any suitable set of one or more known or future developed features, including but not limited to those disclosed in the Background. It should be further noted that the scope of the appended claims do not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof, wherever they appear, shall be construed as open ended terminology, with the same meaning as if the phrase "at least" were appended after each instance thereof.

In the appended claims, if the provisions of 35 USC § 112 ¶ 6 are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112 ¶ 6 are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A method of computer-altering presentation speed of a replacement television advertisement comprising, with a computer associated with a television display, during presentation via the television display of a replacement television advertisement, wherein the replacement television advertisement is being presented in place of a television advertisement embedded within a television signal feed received from a television signal source device, automatically comparing the television signal feed with Internet-received electronic indicia of the embedded television advertisement, to detect a viewing speed difference therebetween, and automatically using the detected viewing speed difference, indicative of a user-control action directed to the television signal source device, to alter presentation speed of the replacement television advertisement in accordance with the user-control action.

2. The method of claim 1 further comprising reverting to presentation of the television signal feed after completing the presentation of the replacement television advertisement via the television display.

3. The method of claim 1 wherein (i) the detected viewing speed difference is indicative of a fast-forward command, and (ii) altering the presentation speed comprises presenting the replacement television advertisement at a faster speed.

4. The method of claim 1 wherein (i) the detected viewing speed difference is indicative of a fast-forward command, and further comprising detecting the fast-forward rate, and (ii) altering the presentation speed comprises presenting the replacement advertisement at the detected fast-forward rate.

5. The method of claim 1 further comprising, after presenting the replacement television advertisement, automatically presenting filler television content via the television display in place of an end portion of the embedded television advertisement.

6. The method of claim 1 wherein (i) the detected viewing speed difference is indicative of a rewind or fast-reverse command, and (ii) altering the presentation speed comprises presenting the replacement television advertisement in a reverse direction.

7. The method of claim 1 further comprising during presentation via the television display, during a time-shifted or on-demand presentation of a television show within the television signal feed after presentation of the replacement television advertisement, of a different replacement television advertisement in place of the embedded television advertisement, automatically comparing the television signal feed with Internet-received electronic indicia of the embedded television advertisement, to detect a viewing speed difference therebetween, and automatically using the detected viewing speed difference, indicative of a user-control action directed to the television signal source device, to alter presentation speed of the different replacement television advertisement in accordance with the user-control action.

8. The method of claim 1 wherein (i) the computer and the television display comprise a smart television, and (ii) the television signal source device comprises a cable or satellite set-top box.

9. The method of claim 1 wherein the comparing is based on whole frames.

10. The method of claim 1 wherein the comparing is based on sample pixels.

11. A smart television apparatus comprising:
(a) a television display;
(b) an Internet connection;
(c) a connection to a television signal source device; and
(d) a computer coupled to the television display, coupled to the Internet connection, coupled to the connection to the television signal source device, and programmed to, during presentation via the television display of a replacement television advertisement, wherein the replacement television advertisement is being presented in place of a television advertisement embedded within a television signal feed received from a television signal source device, automatically compare the television signal feed with Internet-received electronic indicia of the embedded television advertisement, to detect a viewing speed difference therebetween, and to use the viewing speed difference, indicative of a user-control action directed to the television signal source device, to alter presentation speed of the replacement television advertisement in accordance with the user-control action.

12. The smart television apparatus of claim 11 wherein (i) the detected viewing speed difference is indicative of a fast-forward command, and (ii) the computer programmed to automatically alter the presentation speed is programmed to present the replacement television advertisement at a faster speed.

13. The smart television apparatus of claim 11 wherein (i) the detected viewing speed difference is indicative of a fast-forward command, (ii) the computer is further programmed to detect the fast-forward rate, and (iii) the computer is programmed to present the replacement television advertisement at the detected fast-forward rate.

14. The smart television apparatus of claim 11 wherein (i) the detected viewing speed difference is indicative of a rewind or fast-reverse command, and (ii) the computer programmed to automatically alter the presentation speed is programmed to present the replacement television advertisement in a reverse direction.

15. The smart television apparatus of claim 11 wherein the computer is further programmed to, during presentation via the television display, during a time-shifted or on-demand presentation of a television show within the television signal feed after presentation of the replacement television advertisement, of a different replacement television advertisement in place of the embedded television advertisement, automatically compare the television signal feed with Internet-received electronic indicia of the embedded television advertisement, to detect a viewing speed difference therebetween, and automatically use the viewing speed difference, indicative of a user-control action directed to the television signal source device, to alter presentation speed of the different replacement television advertisement in accordance with the user-control action.

16. The smart television apparatus of claim 11 wherein the computer is programmed to perform the comparison based on whole frames.

17. The smart television apparatus of claim 11 wherein the computer is programmed to perform the comparison based on sample pixels.

18. An article comprising a tangible computer-readable medium that is not a transitory propagating signal, in a smart television apparatus or in a storage device controlled by a server connected to a computer network, which medium encodes computer-readable instructions that, when applied to a computer in a smart television, instruct the computer to perform a method of computer-altering presentation speed of a replacement television advertisement comprising, during presentation via the television display of a replacement television advertisement, wherein the replacement television advertisement is being presented in place of a television advertisement embedded within a television signal feed received from a television signal source device, automatically comparing the television signal feed with Internet-received electronic indicia of the embedded television advertisement, to detect a viewing speed difference therebetween, and automatically using the detected the viewing speed difference, indicative of a user-control action directed to the television signal source device, to alter presentation speed of the replacement television advertisement in accordance with the user-control action.

19. The article of claim 18 wherein (i) the detected viewing speed difference is indicative of a fast-forward command, (ii) the computer-readable instructions further instruct the computer to detect the fast-forward rate, and (iii) the computer-readable instructions instruct the computer to present the replacement television advertisement at the detected fast-forward rate.

20. The article of claim 18 wherein the computer-readable instructions further instruct the computer to, during presentation via the television display, during a time-shifted or on-demand presentation via the television display of a television show within the television signal feed after presentation of the replacement television advertisement, of a different replacement television advertisement in place of the embedded television advertisement, automatically compare the television signal feed with Internet-received electronic indicia of the embedded television advertisement, to detect a viewing speed difference therebetween, and automatically use the detected viewing speed difference, indicative of a user-control action directed to the television signal source device, to alter presentation speed of the different replacement television advertisement in accordance with the user-control action.

\* \* \* \* \*